United States Patent [19]
Ritter et al.

[11] 3,734,383
[45] May 22, 1973

[54] APPARATUS FOR MANUFACTURING WELDED WIRE MESH BY FRICTION WELDING

[75] Inventors: Klaus Ritter; Josef Ritter; Gerhard Ritter; Gott Hans, all of Graz, Austria

[73] Assignee: Firma EVG Entwicklungs-U. Verwertungsgessellschaft m.b.H., Graz, Austria

[22] Filed: Apr. 5, 1971

[21] Appl. No.: 130,973

[30] Foreign Application Priority Data

Apr. 7, 1970 Austria ..............................A 3181/70

[52] U.S. Cl. ......................228/2, 29/470.3, 140/112
[51] Int. Cl. ............................................B23k 27/00
[58] Field of Search ........................140/112; 219/78; 228/2; 29/470.3; 156/73

[56] References Cited

UNITED STATES PATENTS

| 2,740,601 | 4/1956 | Knapp | 140/112 X |
| 3,063,476 | 11/1962 | Roesler | 140/112 |
| 3,327,463 | 6/1967 | Nuna et al. | 29/470.3 |
| 3,469,300 | 9/1969 | Nagin | 29/470.3 |

*Primary Examiner*—J. Spencer Overholser
*Assistant Examiner*—Robert J. Craig
*Attorney*—Ernest F. Marmorek

[57] ABSTRACT

In a process for manufacturing welded wire mesh by friction welding the longitudinal wires of said mesh are held stationary at predetermined distances apart and a transverse wire is subjected to tension and caused to oscillate at high frequency and small amplitude in the direction of its own length and is thrust against said longitudinal wires during said oscillation at the crossing points to produce frictional heat in the crossed wires, said oscillation is interrupted upon attainment of welding temperature whereby said crossed wires are welded together, and said thrust is relaxed after cooling and hardening of said welds and the mesh is advanced a step corresponding to the predetermined transverse wire spacing.

11 Claims, 11 Drawing Figures

Patented May 22, 1973
3,734,383
4 Sheets-Sheet 1
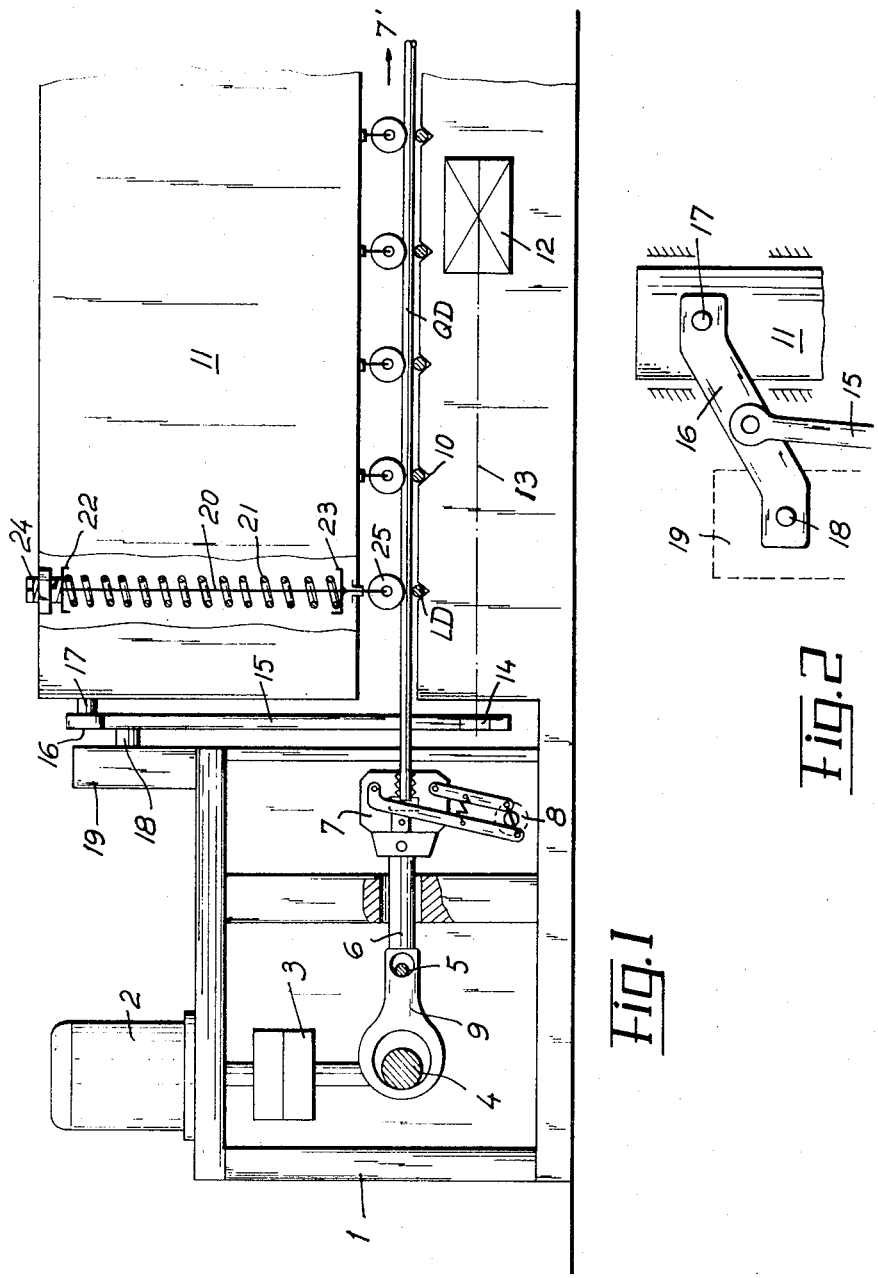
INVENTORS:
Klaus Ritter, Josef Ritter,
Gerhard Ritter and
Hans Gött,
BY
ATTORNEY.

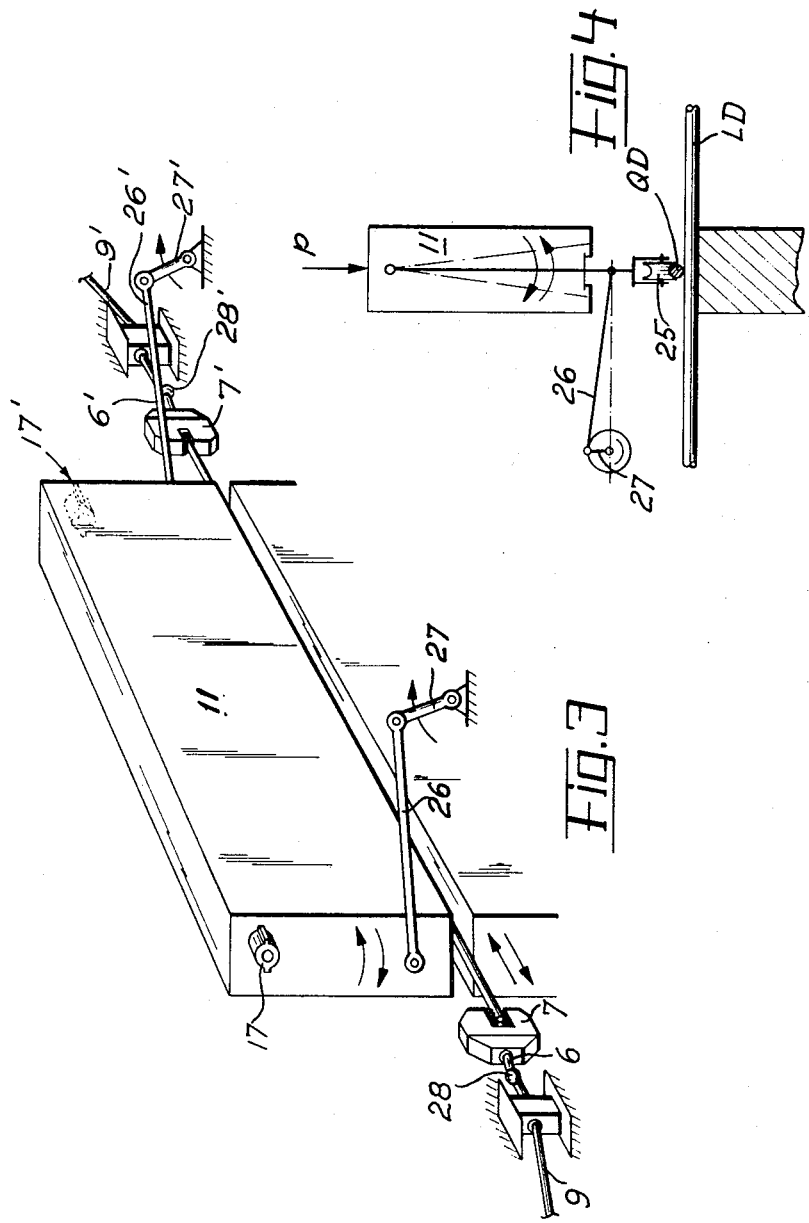

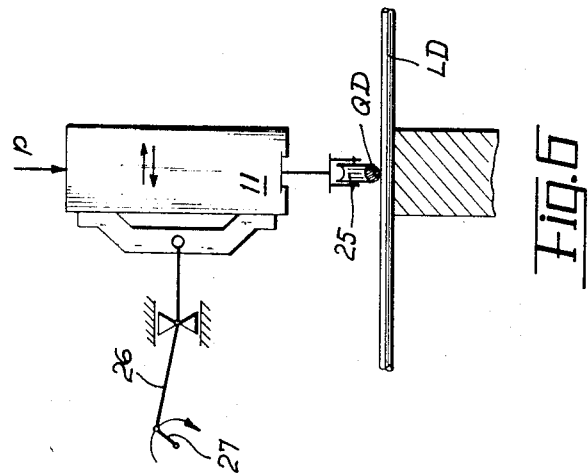
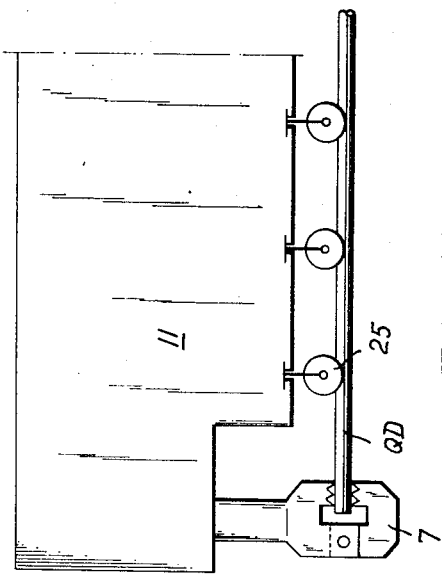

4 Sheets-Sheet 4
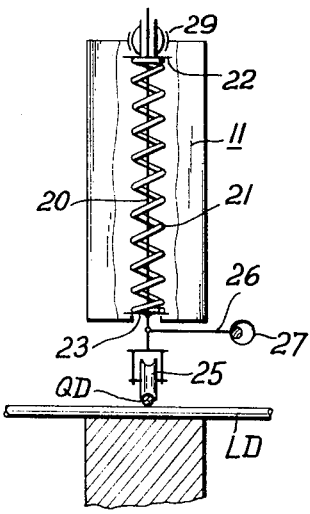
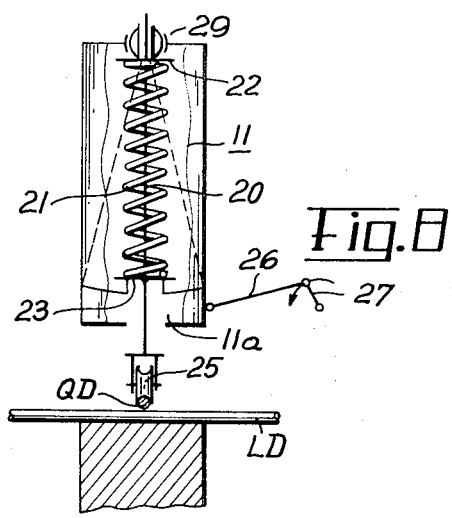
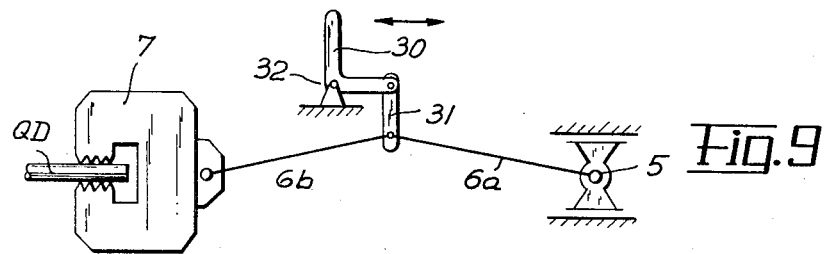
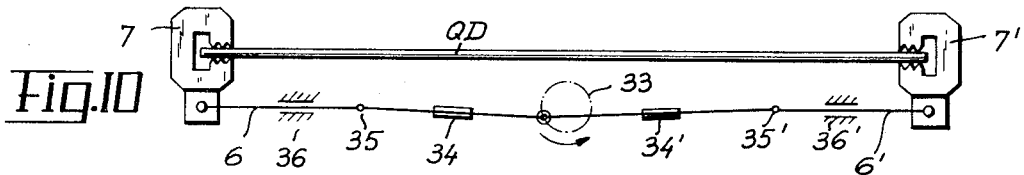
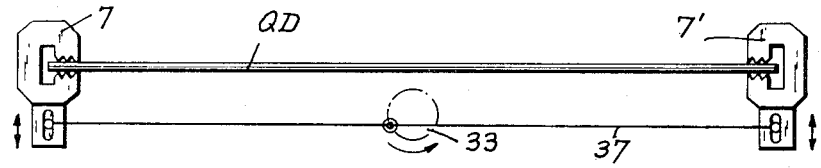
INVENTORS:
Klaus Ritter, Josef Ritter,
Gerhard Ritter and
Hans Gott,
BY Ernst B. Marmorek,
ATTORNEY

APPARATUS FOR MANUFACTURING WELDED WIRE MESH BY FRICTION WELDING

It is known to manufacture wire mesh, preferably of rectangular section wire, by friction welding, transverse wires being secured across an array of parallel longitudinal wires, spaced apart at required distances, thrust being applied to the transverse wires to thrust them down firmly into contact with the longitudinal wires, and the transverse wires being moved over the surfaces of the longitudinal wires, producing heat by friction. The movement is continued until the wires reach welding temperature at the crossing points, whereupon the movement is terminated, with the result that the wires are welded together under pressure at the crossing points.

The machine used for operating this known process has a massive sled mounted movable in a supporting frame in such a way that the sled can oscillate back and forth. The sled, with its supporting frame, can be lifted and lowered perpendicularly with respect to the plane of the mesh, so that thrust can be applied to the transverse wires, thrusting them against the longitudinal wires. The transverse wires are secured in notches in two end plates fixed to the two ends of the sled. Thrust is applied to the transverse wires by the flat lower surface of the sled. The oscillation is applied to the transverse wires by the end plates, in that each end plate in turn thrusts the transverse wire.

Both the method and the machine have several disadvantages, in particular the fact that the transverse wires are driven, during their oscillatory movements, by thrusts applied to their ends, which means that only rods of comparatively large diameter can be handled. Thinner rods would kink. In addition the fact that the transverse wires are thrust down against the longitudinal wires by the flat underside of the sled, limits the applications of the machine in that all the longitudinal wires must have the same diameter. If longitudinal wires of different diameters are inserted into the machine, only the thickest ones become welded.

The object of the present invention is to provide a process for manufacturing welded mesh by friction welding, such that mesh can be made of comparatively thin rod or wire material, for example of the type used for concrete reinforcing mesh, the process enabling mesh to be made having longitudinal wires of different diameters.

In accordance with the present invention wire mesh is manufactured by a friction welding process in which the longitudinal wires are held stationary, at the required distances apart, by retainer devices which hold them where a transverse wire is to be welded across them, the transverse wire being secured at this location, across the longitudinal wires, and put under tension, whereupon the transverse wire is made to oscillate at high frequency but with small amplitude in the directions of its own length and is thrust against the surfaces of the longitudinal wires, during the oscillation, by individual thrusts applied by springs at the crossing points, to produce frictional heat in the crossed wires at the crossing points, the oscillation being interrupted as soon as welding temperature is reached so that the crossed wires are welded together, the thrusts being relaxed after the welds have cooled and hardened and the grating being advanced a step, through a distance corresponding to the desired transverse wire spacing.

It should be observed that, by this method, the transverse wire is stressed in tension and therefore cannot kink, even if comparatively thin rod or wire is used. By using comparatively thin rod or wire, which is easily bent into curves, and by applying individually adjustable spring thrusts to the individual wire crossing points, it becomes possible to ensure a good, firm contact between the transverse wire and each of the longitudinal wires, even if the latter have different thicknesses, consequently mesh can be manufactured, with good reliable welds throughout, using longitudinal wires of different thicknesses.

Preferably the transverse wire is made to oscillate in two directions, both in the directions of its own length and also longitudinally with respect to the longitudinal wires, at high frequency but with little amplitude, the oscillation frequencies being preferably the same in both directions, but with a phase shift of 90° between them. Consequently the two wires at each crossing point oscillate, relatively to each other, in two directions simultaneously, resulting in a circular movement.

For welding gratings containing longitudinal wires of different diameters, the thrusts applied at the individual crossing points are individually suited to the individual longitudinal wire diameters. The longitudinal wires may be fed to the machine from reels, the transverse wires being preferably also fed from reels, or fed in the form of individual lengths which can be cut off, either before or after the welding.

The process can be conducted with two or more transverse wires being welded simultaneously, correctly spaced apart, to the longitudinal wires, neighboring transverse wires being preferably oscillated in opposite directions. If desired the longitudinal wires have notches spaced apart at distances corresponding to the desired transverse wire spacing, the notches in all the longitudinal wires being lined up so that they come in line where the transverse wires will be welded across the longitudinal wires.

A friction welding machine suitable for operating the process according to the invention includes a thrust beam extending across the width of the machine and capable of moving at least perpendicularly with respect to the plane occupied in use by the mesh, the thrust beam having at least one row of spring loaded thrust and guiding rods, the row extending longitudinally with respect to the thrust beam, each thrust and guiding rod having at its lower end a thrusting device, for thrusting a transverse wire against the surface of a longitudinal wire LD, at the crossing point, and a pair of grippers for the or each row of thrust and guiding rods, one at each end of the row, near the two ends of the thrust beam, each gripper being arranged so that, cooperating with the other gripper of the pair, it can apply tension to the transverse wire and subsequently give the transverse wire a linear oscillation.

The fact that each transverse wire is gripped at its two ends by grippers, which impart to it the oscillatory movement, provides several advantages. In the first place the grippers can be arranged to oscillate the wire independently of the beam, whereby the masses which have to be accelerated are reduced to the minimum. This not only saves power, and reduces the weight of the machine, but also reduces fatigue in the parts. Even very thin wire can be welded, due to the fact that the two grippers hold the wire constantly under tension; the wire is driven, during its oscillatory movement, exclusively by applied tensile forces, that is to say the wire is pulled by the gripper at its leading end. Consequently the transverse wire is always straight, and cannot kink.

One example of a machine, with several modifications, and its method of operation in accordance with the invention will now be described with reference to the accompanying drawings, in which:

FIG. 1 is a partly sectioned front view of a friction welding machine according to the invention;

FIG. 2 shows a detail of a suspension system for a thrust beam, as seen from the side;

FIG. 3 is an axonometric, diagrammatical representation of a preferred version of the thrust beam, showing also the gripper device and the drive system;

FIG. 4 is a diagrammatical side view of the thrust beam of FIG. 3;

FIG. 5 shows diagrammatically a modified thrust beam to which is fixed a gripper device;

FIG. 6 shows diagrammatically a thrust beam arranged according to a further modification so that it can be oscillated longitudinally with respect to the longitudinal wires;

FIGS. 7 and 8 are diagrammatical sections through a thrust beam of another modification arranged so that the thrust and guiding rods can be oscillated relative to the thrust beam;

FIG. 9 represents an arrangement for tensioning the transverse wire by displacing a gripper device;

FIGS. 10 and 11 show further possible methods for imparting oscillation to the gripper devices.

In FIG. 1 there is mounted on a machine frame 1 a motor 2 which drives, through a clutch-brake device 3, an eccentric 4, which imparts oscillation through a connecting rod 9 and a pin coupling 5 to a rod 6. On the other end of the rod 6 there is mounted a gripper 7 which is actuated by a gripper actuator device 8, which is represented only diagrammatically because it is of a known kind. The gripper actuator 8 opens and closes the gripper 7. At the other end of the machine there is a similar gripper 7', which is represented merely by an arrow in FIG. 1. The two eccentrics 4, for the two grippers, are coupled together by known means so that they oscillate in synchronization, driven by the motor 2. At least at one end of the machine the coupling 5, between the driving rod 6 and the connecting rod 9, contains an eccentric. This is used for applying a preliminary tension to a transverse wire QD, before the beginning of the oscillatory movement which generates frictional heat for the welding.

The longitudinal wires LD rest in guiding grooves or notches 10 on the machine subframe. If the machine is intended for making wire gratings which always have the same longitudinal wires spacing, the guiding grooves 10 can be cut directly in the machine subframe, as represented in FIG. 1. On the other hand if it is desired to make wire gratings with different longitudinal wire spacing, separate grooved guides can be mounted on the machine subframe, adjustable in position to give the different longitudinal wire spacings.

Above the wire array QD, LD there is a thrust beam 11 which extends over the full width of the machine, parallel to the transverse wires. The thrust beam 11 is mounted so that it can be moved in directions perpendicular to the plane of the wire array QD, LD.

There is a second motor 12 which drives, through a drive shaft which is merely indicated at 13, a second eccentric 14 which works in the lower end of a connecting rod 15, which is pivoted at its upper end to a lever 16, as shown in FIG. 2. The lever 16 is pivoted at one end, at 18, to a frame 19 fixed to the machine frame, and at its other end, at 17, to the thrust beam 11. By rotation of the shaft 13 the thrust beam 11 can be lifted away from, and lowered down towards the wire array QD, LD.

In the interior of the thrust beam 11 there are thrust and guiding rods 20, one for each wire crossing point. In a machine which is intended for making wire gratings with variable longitudinal wire spacing, the thrust and guiding rods 20 are arranged so that they are individually adjustable in position along the thrust beam. Each thrust and guiding rod 20 is spring loaded by a helical spring 21 which thrusts, at its bottom end, against a collar plate 23 fixed to the thrust and guiding rod 20, and at its upper end against a plate 22 backed by a threaded bolt 24, which allows adjustment of the spring thrust.

Mounted on the lower end of each rod 20 there is a grooved roller 25 which guides the transverse wire QD and thrusts it down against the longitudinal wires LD.

The machine is preferably supplied with wire from reels. The feeding mechanism for the wire is the same as that used in wire grating welding machines which operate by electric resistance welding. These wire feeding systems need therefore not be described here.

The machine functions as follows:

After a transverse wire QD has been fed to the machine, the two grippers 7, 7' are closed by the actuators 8, so that the grippers grip the transverse wire. The eccentric 5 is actuated, applying tension to the transverse wire QD.

The motor 12 is energized and, acting through the parts 13 to 16, lowers the grooved rollers 25 down onto the transverse wire QD, thrusting it down against the longitudinal wires LD at the wire crossing points. The motor 2 runs continuously. With the transverse wire QD being thrust down firmly against the longitudinal wires LD, the clutch-brake device 3 is engaged, acting as a clutch, imparting over the eccentric 4 a rapid oscillation to the grippers, so that the transverse wire QD oscillates longitudinally, that is to say in the direction of its own length, at high frequency but with little amplitude.

As soon as the wires have reached welding temperature, at their crossing points, the clutch 3 is disengaged and then reengaged acting as a brake, bringing the transverse wire QD to a standstill. The motor 12 is energized again and, acting through the parts 13 to 16, lowers the thrust beam 11 still further so that sufficient pressure is applied at the wire crossing points to make a good weld between the wires, at each crossing point.

As soon as the welds have hardened, the thrust beam is raised up to its position of rest, and the longitudinal wires LD are advanced one step, a fresh transverse wire is fed and the working cycle begins again.

It has been found that it is in many cases desirable to give the transverse wire QD movements in the directions, that is to say not only in the direction of its own length but also a movement longitudinally with respect to the longitudinal wires. This can be obtained by several alternative methods.

One method is represented by the version of the invention shown in FIGS. 3 and 4. In this case the thrust beam 11 is mounted to pivot on two pivot pins 17, 17'. The lower part of the thrust beam 11 is swung, that is to say made to oscillate by a crank 27 driving through a connecting link 26. The thrust beam 11 transmits this oscillation through the rollers 25 to the transverse wire QD, oscillating the transverse wire longitudinally with respect to the longitudinal wires. This oscillation has a very small amplitude, of the order of 5 mm, and consequently the movement of the transverse wire is practically linear.

To allow the grippers 7, 7' to follow this oscillation of the thrust beam 11, each driving rod 6, 6' has an articulated coupling 28, 28' which gives the gripper 7, 7' a limited freedom of movement longitudinally with respect to the longitudinal wires. The gripper can if desired be fixed directly under the thrust beam 11, as shown in FIG. 5.

Instead of suspending the thrust beam on pivots, as represented in FIG. 3, it can if desired be arranged so that it oscillates entirely, that is to say parallel to its self, as shown in FIG. 6. However this solution is not favored, because it involves acceleration of an excessively large mass.

The mass which has to be accelerated can be reduced to a comparatively small value by arranging the thrust and guiding rods 20 so that they oscillate independently longitudinally, with respect to the longitudinal wires, as shown in FIG. 7. Alternatively the thrust beam 11 can be constructed in two parts, as shown in FIG. 8, only the lower part oscillating longitudinally with the thrust and guiding rods 20.

With reference to FIG. 7, the thrust and guiding rods 20 are secured at their upper ends in a pivot 29 in the upper end of the thrust beam 11 the lower end of the rod 20 is driven to oscillate by an accentric 27, driving through a connecting link 26. It should be observed that when the oscillation begins the helical spring 21 is already compressed to a certain extent and the collar plate 23 is already lifted clear of its seat in the thrust beam 11. The rod 20 is therefore free to oscillate longitudinally in the beam 11.

In FIG. 8 the thrust beam 11 has a lower part 11a which can oscillate in a circular movement about the point 29, relative to the stationary upper part 11. For this purpose the two ends of the thrust beam are equipped with supporting plates in the form of circular segments. The seats for the collar plates 23 are in the lower part of the beam 11. The lower part of the beam 11 is driven in oscillation by a crank 27 driving through a connecting link 26.

FIG. 9 shows a tensioning system for applying tension to the transverse wire through the gripper. In this case the driving rod 6 for the gripper consists of two parts 6a and 6b forming an angle with each other. An angle lever 30 is pivoted on the machine housing at 32, one arm of the lever being connected by a link 31 to the junction between the two driving rod parts 6a and 6b. As soon as the two grippers have gripped the transverse wire, the angle lever 30 is actuated, at one end of the machine, reducing the enclosed angle between the two parts 6a and 6b, applying tension to the gripper 7 and so to the transverse wire QD.

FIGS. 10 and 11 show two further versions of the drive, for applying oscillation to the grippers 7, 7'. In both cases oscillation is applied by a central crank 33. In FIG. 10 the drive is transmitted to the grippers through connecting rods pivoted at 35, 35' to driving rods 6, 6', which are guided to move in straight lines. Each connecting rod has a tensioning device 34, 34', for example in the form of a hydraulic piston in a cylinder, for applying tension to the transverse wire.

In FIG. 11 the central crank 33 drives the grippers 7, 7' through a driving rod 37 whose ends are guided in slots in the grippers, the driving rod 37 being constrained to move parallel to itself by a guiding system of the known kind.

As already mentioned, within the frame of the invention longitudinal wires can be used which have notches at the locations where the transverse wires are to be welded. In machines of the kind in which the transverse wire oscillates only in the direction of its own length, the notches are preferably cut into the longitudinal wires by cutters mounted on the thrust beam and arranged so that they can be raised and lowered. This has the advantage that all the notches are cut precisely on the straight line which will subsequently be occupied by the transverse wire.

The examples described above do not exhaust the range of possible versions of the invention. Other variants will easily occur to the technologist. For example instead of the grooved rollers mounted on the lower ends of the thrust and guiding rods, there can if desired be used spring mounted thrust shoes capable of following the movements of the transverse wire, in which case neither a sliding friction nor a rolling friction is involved.

We claim:

1. A friction welding machine adapted to manufacture welded wire mesh, said machine comprising a thrust beam extending transversely of said machine, means mounting said thrust beam to said machine for movement of said beam perpendicularly relatively to the plane occupied by said mesh, a row of spring loaded thrust and guiding rods mounted to said beam, said row extending longitudinally of said beam, thrusting means at the lower end of each of said thrust and guiding rods for thrusting a transverse wire against a longitudinal wire at a crossing point, a pair of gripping means one at each end of said row of thrust and guiding rods adjacent the ends of said beam, means for applying tension to a transverse wire extending between said gripping means, and means for causing said transverse wire to oscillate.

2. A machine according to claim 1, including adjustment means for each of said thrust and guiding rods.

3. A friction welding machine adapted to manufacture welded wire mesh, said machine comprising a thrust beam extending transversely of said machine, means mounting said thrust beam to said machine for movement of said beam perpendicularly relatively to the plane occupied by said mesh, a row of spring loaded thrust and guiding rods mounted to said beam, said row extending longitudinally of said beam, thrusting means at the lower end of each of said thrust and guiding rods for thrusting a transverse wire against a longitudinal wire at a crossing point, a pair of gripping means one at each end of said row of thrust and guiding rods adjacent the ends of said beam, means for applying tension to a transverse wire extending between said gripping means, and means for causing said transverse wire to oscillate, and each thrusting means being a grooved roller.

4. A friction welding machine adapted to manufacture welded wire mesh, said machine comprising a thrust beam extending transversely of said machine, means mounting said thrust beam to said machine for movement of said beam perpendicularly relatively to the plane occupied by said mesh, a row of spring loaded thrust and guiding rods mounted to said beam, said row extending longitudinally of said beam, thrusting means at the lower end of each of said thrust and guiding rods for thrusting a transverse wire against a longitudinal wire at a crossing point, a pair of gripping means one at each end of said row of thrust and guiding rods adjacent the ends of said beam, means for applying tension to a transverse wire extending between said gripping means, and means for causing said transverse wire to oscillate, and further including an actuating means operably connected to said thrusting means for causing said thrusting means to oscillate in directions perpendicular to said transverse wire.

5. A machine according to claim 4, wherein said mounting means for said thrust beam is a pivotable mounting, adapted to permit oscillation of said beam about an axis extending parallel to said transverse wire, and said actuating means is a rotary actuating means.

6. A machine according to claim 4, wherein said thrust beam mounting means is adapted to permit bodily movement of said thrust beam longitudinally with respect to said longitudinal wires, and said actuating means is a rotary means.

7. A machine according to claim 4, including mounting means for each of said thrust and guiding rods adapted to permit oscillation of said thrust and guiding rod relatively to said beam about an axis extending along said beam parallel to said transverse wire, and actuating means for said thrust and guiding rods comprising rotary means.

8. A friction welding machine adapted to manufacture welded wire mesh, said machine comprising a thrust beam extending transversely of said machine, means mounting said thrust beam to said machine for movement of said beam perpendicularly relatively to the plane occupied by said mesh, a row of spring loaded thrust and guiding rods mounted to said beam, said row extending longitudinally of said beam, thrusting means at the lower end of each of said thrust and guiding rods for thrusting a transverse wire against a longitudinal wire at a crossing point, a pair of gripping means one at each end of said row of thrust and guiding rods adjacent the ends of said beam, means for applying tension to a transverse wire extending between said gripping means, and means for causing said transverse wire to oscillate, and further including actuating means operably connected with said gripping means for imparting synchronous oscillations to said gripping means.

9. A friction welding machine adapted to manufacture welded wire mesh, said machine comprising a thrust beam extending transversely of said machine, means mounting said thrust beam to said machine for movement of said beam perpendicularly relatively to the plane occupied by said mesh, a row of spring loaded thrust and guiding rods mounted to said beam, said row extending longitudinally of said beam, thrusting means at the lower end of each of said thrust and guiding rods for thrusting a transverse wire against a longitudinal wire at a crossing point, a pair of gripping means one at each end of said row of thrust and guiding rods adjacent the ends of said beam, means for applying tension to a transverse wire extending between said gripping means, and means for causing said transverse wire to oscillate, further including a driving mechanism for said gripping means and mounting means for said driving means adapted to permit displacement apart of said gripping means whereby to apply tension to said transverse wire extending between said gripping means.

10. A friction welding machine adapted to manufacture welded wire mesh, said machine comprising a thrust beam extending transversely of said machine, means mounting said thrust beam to said machine for movement of said beam perpendicularly relatively to the plane occupied by said mesh, a row of spring loaded thrust and guiding rods mounted to said beam, said row extending longitudinally of said beam, thrusting means at the lower end of each of said thrust and guiding rods for thrusting a transverse wire against a longitudinal wire at a crossing point, a pair of gripping means one at each end of said row of thrust and guiding rods adjacent the ends of said beam, means for applying tension to a transverse wire extending between said gripping means, and means for causing said transverse wire to oscillate, further including driving means for said gripping means, said driving means being secured to the machine frame, and means connecting said gripping means to said driving means adapted to permit movement of said gripping means relative to said driving means.

11. A friction welding machine adapted to manufacture welded wire mesh, said machine comprising a thrust beam extending transversely of said machine, means mounting said thrust beam to said machine for movement of said beam perpendicularly relatively to the plane occupied by said mesh, a row of spring loaded thrust and guiding rods mounted to said beam, said row extending longitudinally of said beam, thrusting means at the lower end of each of said thrust and guiding rods for thrusting a transverse wire against a longitudinal wire at a crossing point, a pair of gripping means one at each end of said row of thrust and guiding rods adjacent the ends of said beam, means for applying tension to a transverse wire extending between said gripping means, and means for causing said transverse wire to oscillate, wherein said gripping means and a driving mechanism for said gripping means are mounted on said beam, whereby said gripping means share movements of said beam.

* * * * *